(12) United States Patent
Iwamoto

(10) Patent No.: US 11,307,382 B2
(45) Date of Patent: Apr. 19, 2022

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 16/692,953

(22) Filed: Nov. 22, 2019

(65) Prior Publication Data

US 2020/0174233 A1 Jun. 4, 2020

(30) Foreign Application Priority Data

Nov. 29, 2018 (JP) .............................. JP2018-224135

(51) Int. Cl.
*G02B 9/10* (2006.01)
*G02B 15/14* (2006.01)
*G02B 27/00* (2006.01)

(52) U.S. Cl.
CPC ........... *G02B 9/10* (2013.01); *G02B 15/1421* (2019.08); *G02B 27/005* (2013.01)

(58) Field of Classification Search
None
See application file for complete search history.

(56) References Cited

U.S. PATENT DOCUMENTS

| 5,113,287 | A | 5/1992 | Nakayama | |
| 7,426,083 | B2 * | 9/2008 | Endo | G02B 13/02 359/745 |
| 9,001,440 | B2 | 4/2015 | Saori | |
| 11,009,676 | B2 * | 5/2021 | Okada | G02B 9/64 |
| 2014/0153118 | A1 * | 6/2014 | Onozaki | G02B 13/06 359/795 |
| 2017/0336608 | A1 * | 11/2017 | Gyoda | G02B 27/646 |

FOREIGN PATENT DOCUMENTS

| JP | 1-316714 A | 12/1989 |
| JP | 10-197793 A | 7/1998 |
| JP | 2014-126652 A | 7/2014 |

\* cited by examiner

*Primary Examiner* — Darryl J Collins
(74) *Attorney, Agent, or Firm* — Canon U.S.A., Inc. IP Division

(57) ABSTRACT

An optical system includes, in order from an object side to an image side, a first lens unit having positive refractive power, and a second lens unit having negative refractive power, wherein the first lens unit moves and the second lens unit does not move during focusing, wherein the first lens unit includes a positive lens arranged closest on the object side of the first lens unit, wherein the second lens unit includes three or more lenses including at least two negative lenses, wherein the first lens unit consists of a first subunit having positive refractive power, a second subunit having negative refractive power, and a third subunit having positive refractive power arranged in order from the object side to the image side, and wherein predetermined conditional expressions are satisfied.

19 Claims, 15 Drawing Sheets

OPTICAL SYSTEM AND IMAGE PICKUP APPARATUS INCLUDING THE SAME

BACKGROUND OF THE INVENTION

Field of the Invention

The aspect of the embodiments relates to an optical system, which is for a digital video camera, a digital still camera, a broadcast camera, a silver-halide film camera, a monitoring camera, and the like.

Description of the Related Art

Examples of an optical system to be used for an image pickup apparatus such as a digital camera or a video camera include a telephoto optical system having a large aperture with a long focal length and a small F-number.

Such an optical system is required to be small in size and to have high optical performance, and is further required to respond to rapid focusing with an autofocus function. In addition, there may be demand for shortening the shortest image-pickup distance and increasing the maximum image-pickup magnification.

U.S. Pat. No. 9,001,440 describes an optical system that consists of a positive first lens unit and a positive or negative second lens unit arranged in order from the object side to the image side, and performs focusing with the first lens unit driven. The optical system described in U.S. Pat. No. 9,001,440 is a so-called macro lens that enables a short-distance image pickup.

However, there has been the following issue for the optical system described in U.S. Pat. No. 9,001,440, when the shortest image-pickup distance is shortened, and the focal length is made longer, and the aperture ratio is made larger. That is, there has been a possibility that rapid focusing is difficult, resulting from difficulty in simultaneous achievement of reduction in weight of the first lens unit, reduction of the moving amount accompanying focusing, and achievement of high optical performance.

SUMMARY OF THE INVENTION

According to an aspect of the embodiments, an optical system includes, in order from an object side to an image side, a first lens unit having positive refractive power, and a second lens unit having negative refractive power, wherein the first lens unit moves and the second lens unit does not move during focusing, wherein the first lens unit includes a positive lens arranged closest on the object side of the first lens unit, wherein the second lens unit includes three or more lenses including at least two negative lenses, wherein when the first lens unit is divided at a largest interval and a second largest interval of intervals between adjacent lenses in the first lens unit, the first lens unit consists of a first subunit having positive refractive power, a second subunit having negative refractive power, and a third subunit having positive refractive power arranged in order from the object side to the image side, and wherein the following conditional expressions are satisfied:

$$0.14 < sk/f < 0.30$$

$$0.59 < f13/f < 1.21$$

where sk represents a distance on an optical axis from a lens surface closest to the image side of the second lens unit to an image plane, f represents a focal length of the optical system in an in-focus state on an infinite-distance object, and f13 represents a focal length of the third subunit.

Further features of the disclosure will become apparent from the following description of exemplary embodiments with reference to the attached drawings.

DESCRIPTION OF THE EMBODIMENTS

Figure 1:
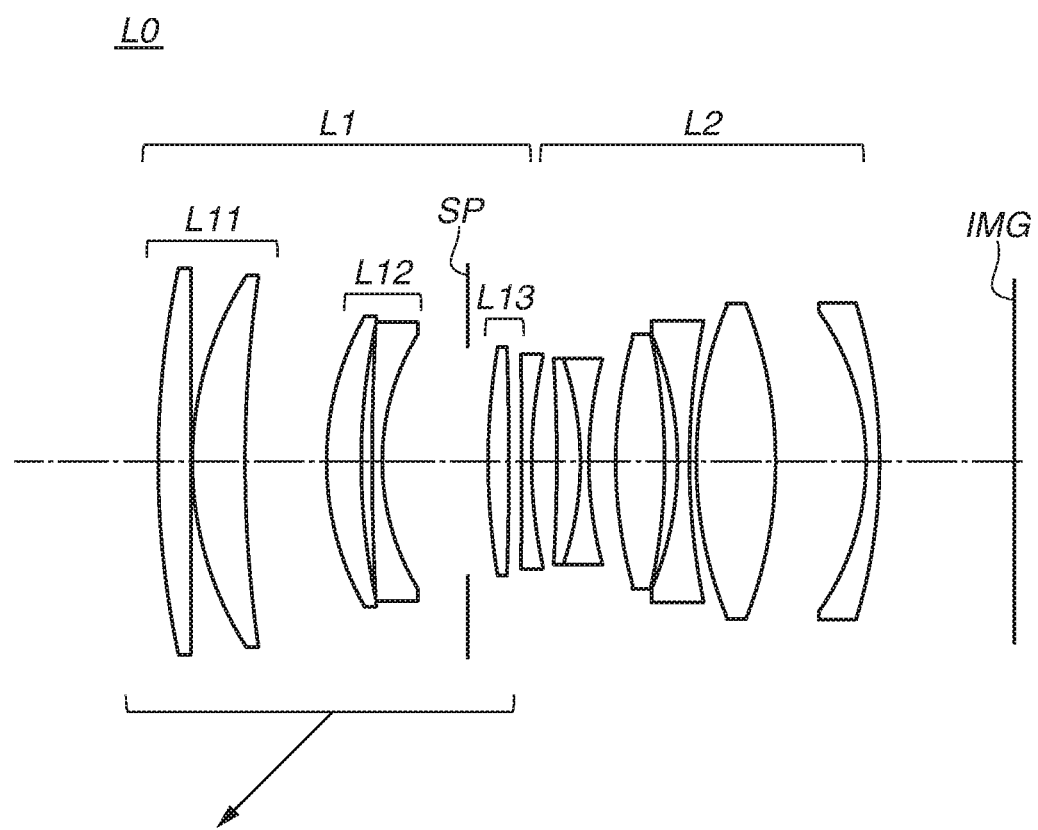
FIG. 1 is a cross-sectional view of an optical system according to a first exemplary embodiment.

Exemplary embodiments of an optical system of the disclosure and an image pickup apparatus including the optical system will be described below with reference to the accompanying drawings.

FIGS. 1, 3, 5, 7, 9, 11, and 13 are cross-sectional views of optical systems according to the first, second, third, fourth, fifth, sixth, and seventh exemplary embodiments, respectively, in an in-focus state on an infinite-distance object. The optical system according to each exemplary embodiment is an optical system to be used for an image pickup apparatus such as a digital video camera, a digital still camera, a broadcast camera, a silver-halide film camera, or a monitoring camera.

In each lens cross-sectional view, the left side is the object side and the right side is the image side. The optical system according to each exemplary embodiment includes a plurality of lens units. In the present specification, each lens unit is a group of lenses that moves or stops together during focusing. That is, in the optical system according to each exemplary embodiment, the intervals between adjacent lens units change during focusing from infinity to a short distance. Each lens unit may consist of one lens, or may consist of a plurality of lenses. Each lens unit may also include an aperture stop.

An optical system L0 according to each exemplary embodiment consists of a first lens unit L1 having positive refractive power and a second lens unit L2 having negative refractive power arranged in order from the object side to the image side.

In the optical system according to each exemplary embodiment, the first lens unit L1 consists of a first subunit L11 having positive refractive power, a second subunit L12 having negative refractive power, and a third subunit L13 having positive refractive power arranged in order from the object side to the image side. One of the interval between the first subunit L11 and the second subunit L12 and the interval between the second subunit L12 and the third subunit L13 is the largest interval and the other is the second largest interval, of the intervals (air intervals) between the lenses forming the first lens unit L1. That is, it can be said that each of the first subunit L11 to the third subunit L13 is any of the subunits when the first lens unit L1 is divided by the largest interval and the second largest interval of the intervals between the lenses forming the first lens unit L1. When the intervals between the lenses in the first lens unit L1 include two largest intervals, the subunits separated by the two largest intervals are the first subunit L11, the second subunit L12, and the third subunit L13.

SP represents the aperture stop. IP represents an image plane. When the optical system according to each exemplary embodiment is used as an image-pickup optical system for a digital still camera or a digital video camera, the image pickup surface of a solid-state image pickup element (photoelectric conversion element) such as a charge-coupled device (CCD) sensor or a complementary metal oxide semiconductor (CMOS) sensor is arranged. When the optical system according to each exemplary embodiment is used as an image-pickup optical system for a silver-halide film camera, a photosensitive surface corresponding to a film surface is placed on the image plane IP.

Furthermore, the optical system L0 according to each exemplary embodiment has such a configuration that the first lens unit L1 moves during focusing. An arrow indicated by a solid line in each lens cross-sectional view represents the moving direction of the first lens unit L1 during focusing from infinity to a short distance. In the optical system according to each exemplary embodiment, the second lens unit L2 does not move during focusing.

Figure 2:
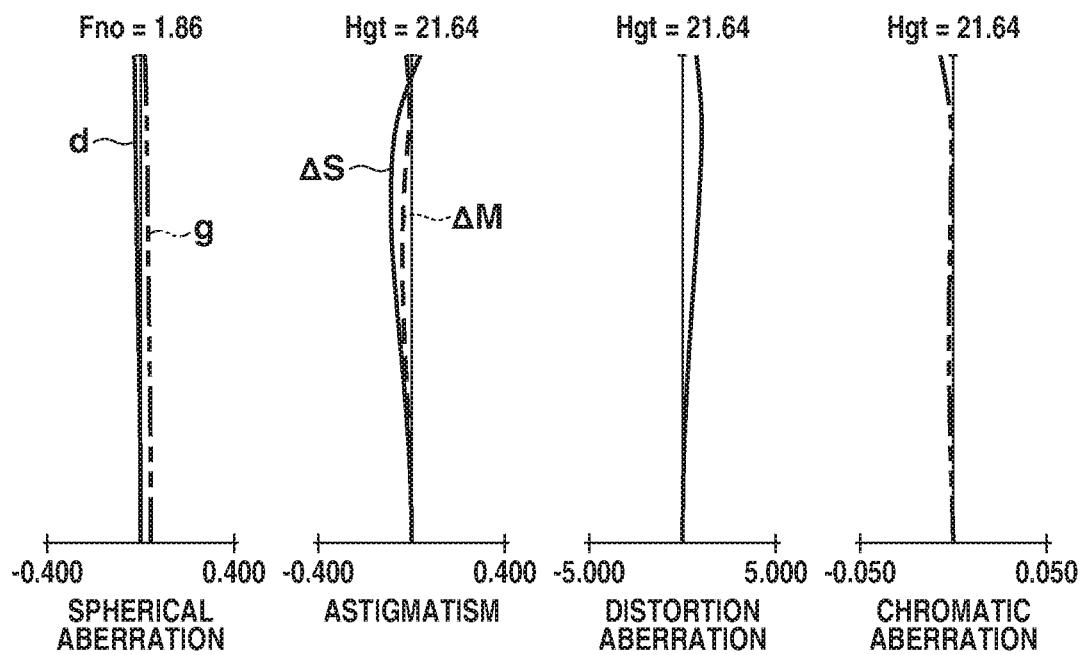
FIG. 2 is an aberration diagram of the optical system according to the first exemplary embodiment.
Figure 2:
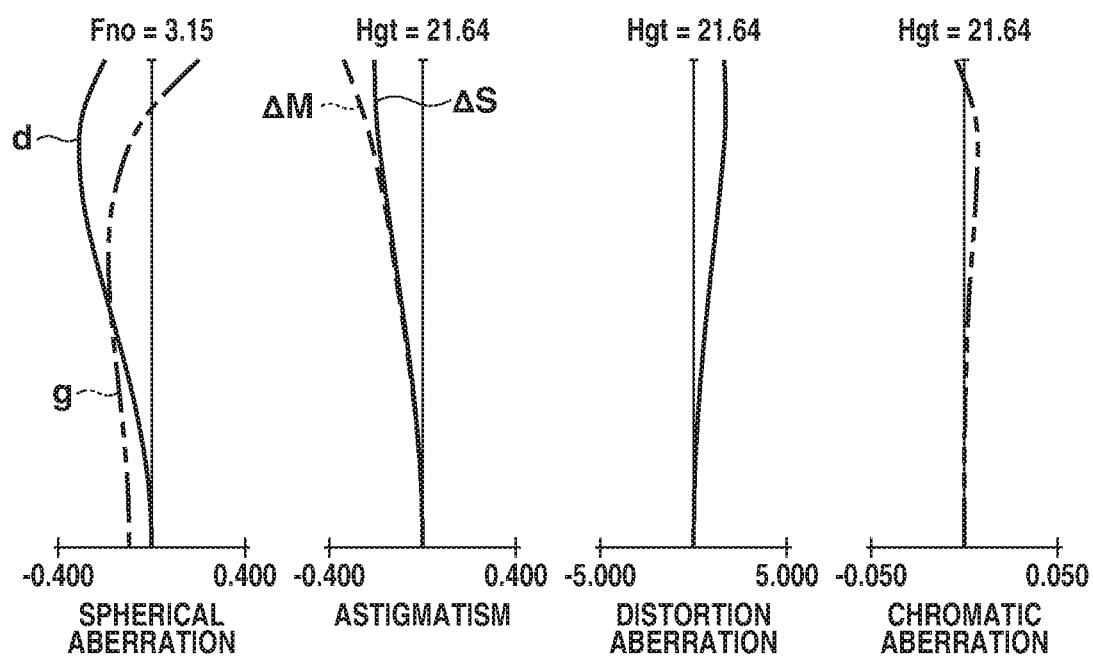
Figure 3:
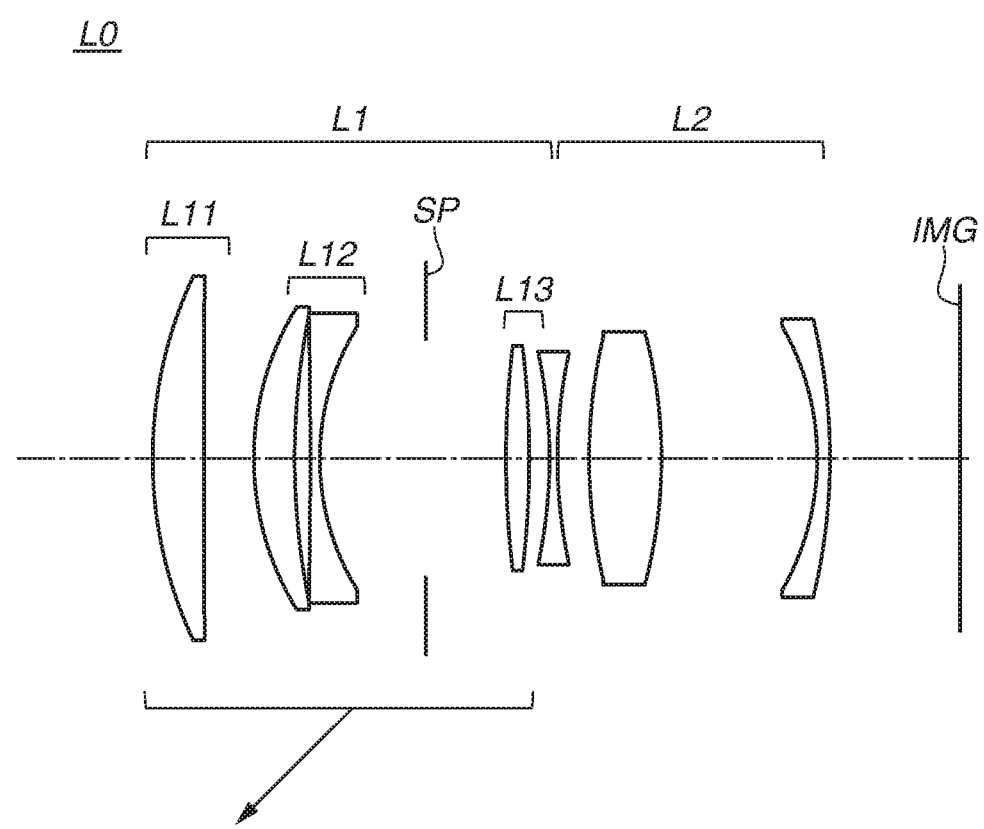
FIG. 3 is a cross-sectional view of an optical system according to a second exemplary embodiment.
Figure 4:
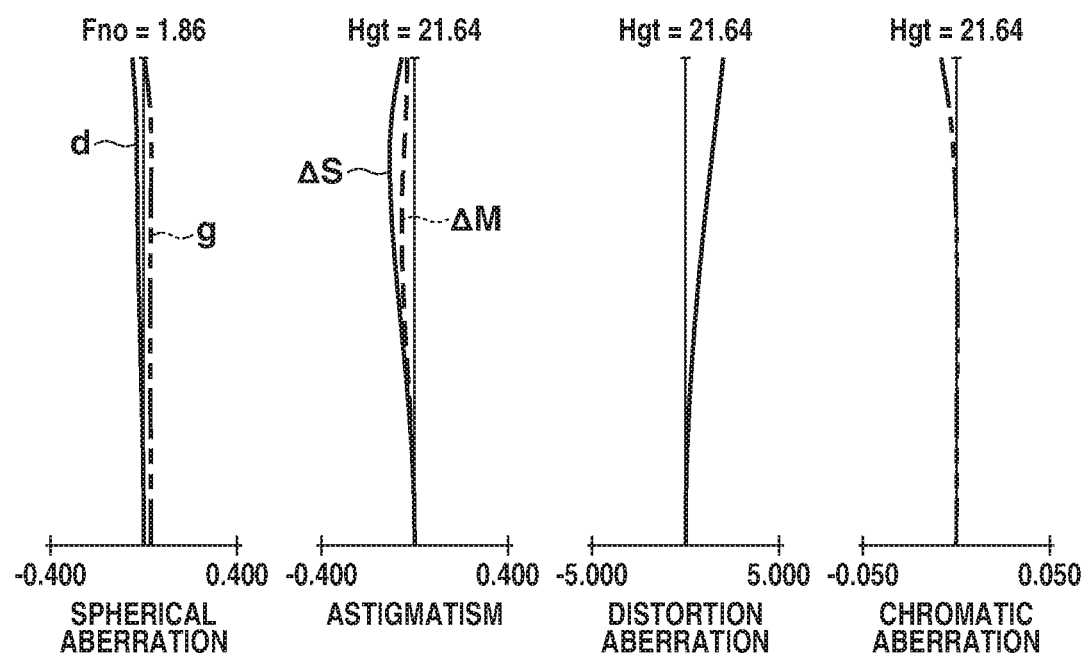
FIG. 4 is an aberration diagram of the optical system according to the second exemplary embodiment.
Figure 4:
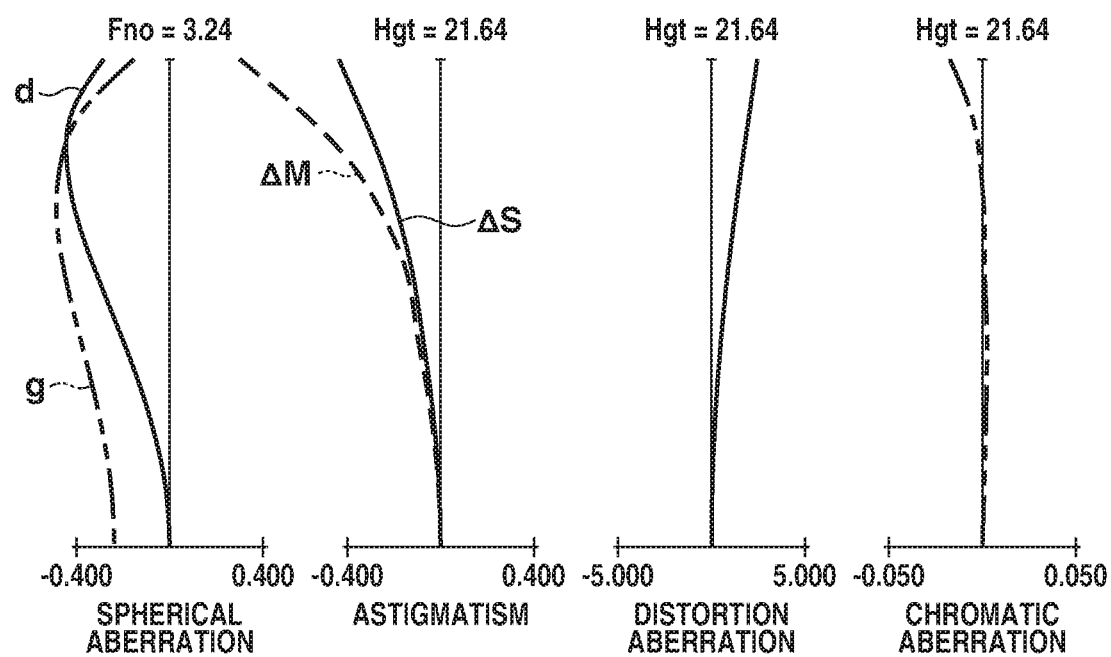
Figure 5:
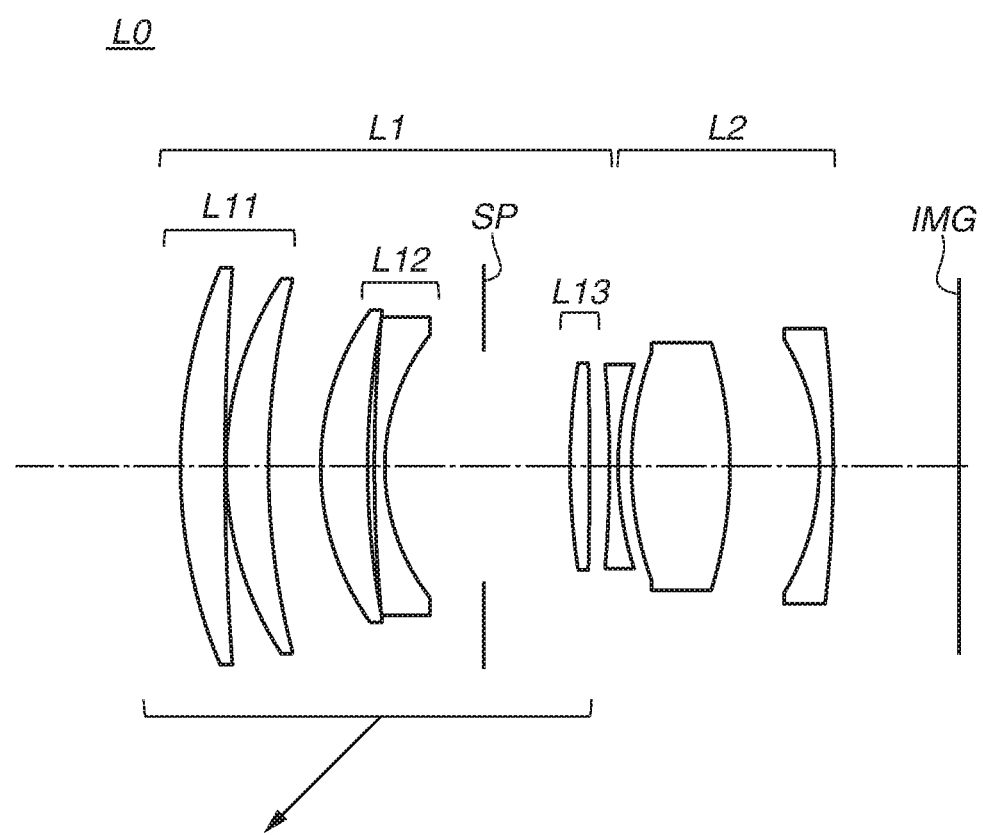
FIG. 5 is a cross-sectional view of an optical system according to a third exemplary embodiment.
Figure 6:
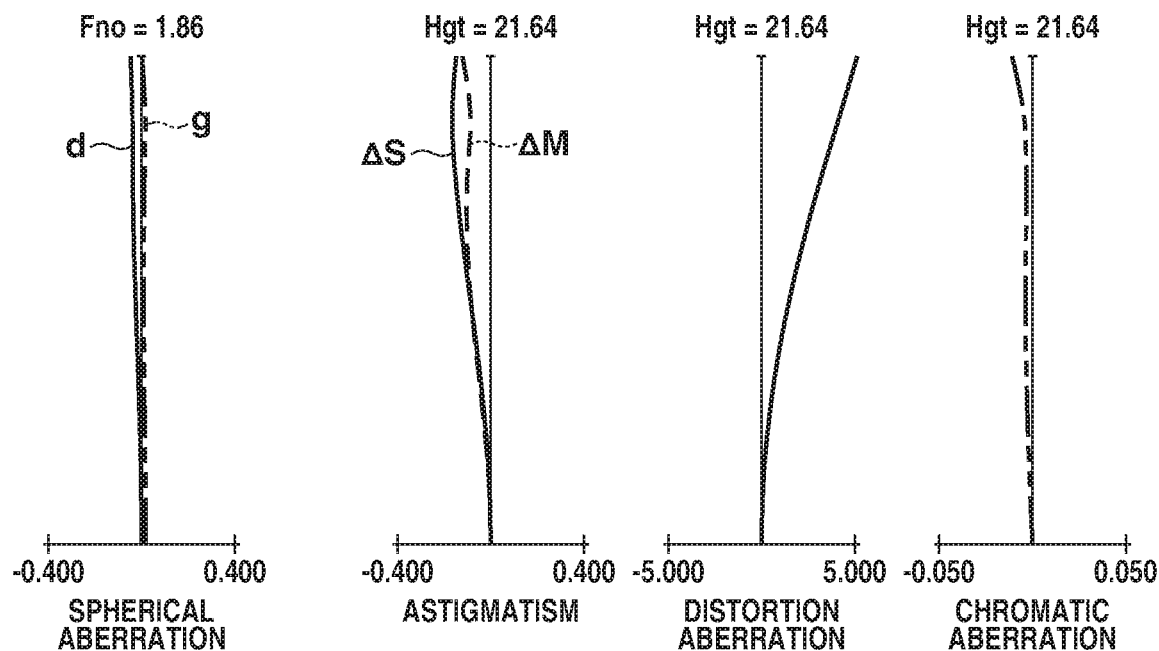
FIG. 6 is an aberration diagram of the optical system according to the third exemplary embodiment.
Figure 6:
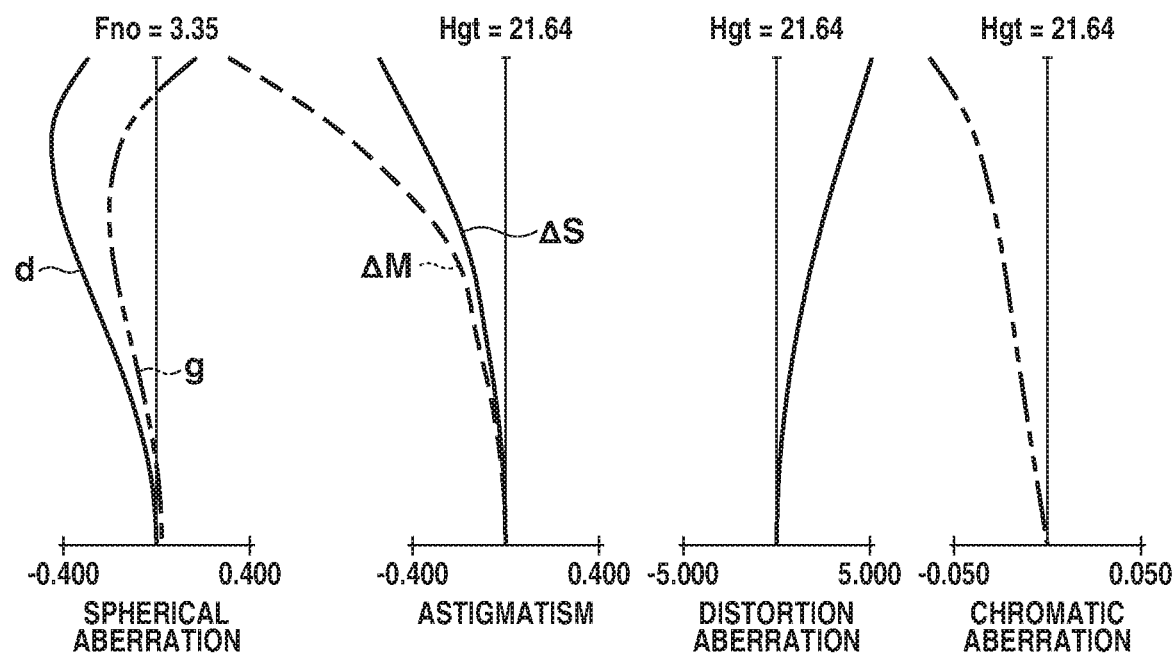
Figure 7:
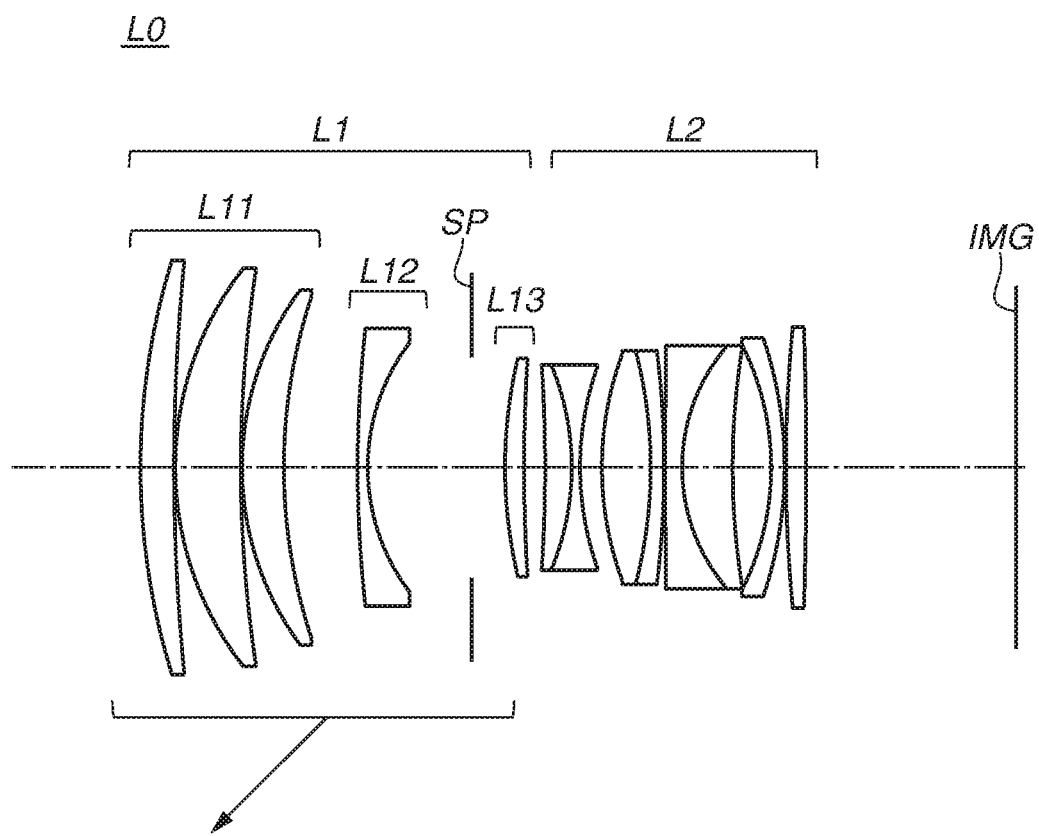
FIG. 7 is a cross-sectional view of an optical system according to a fourth exemplary embodiment.
Figure 8:
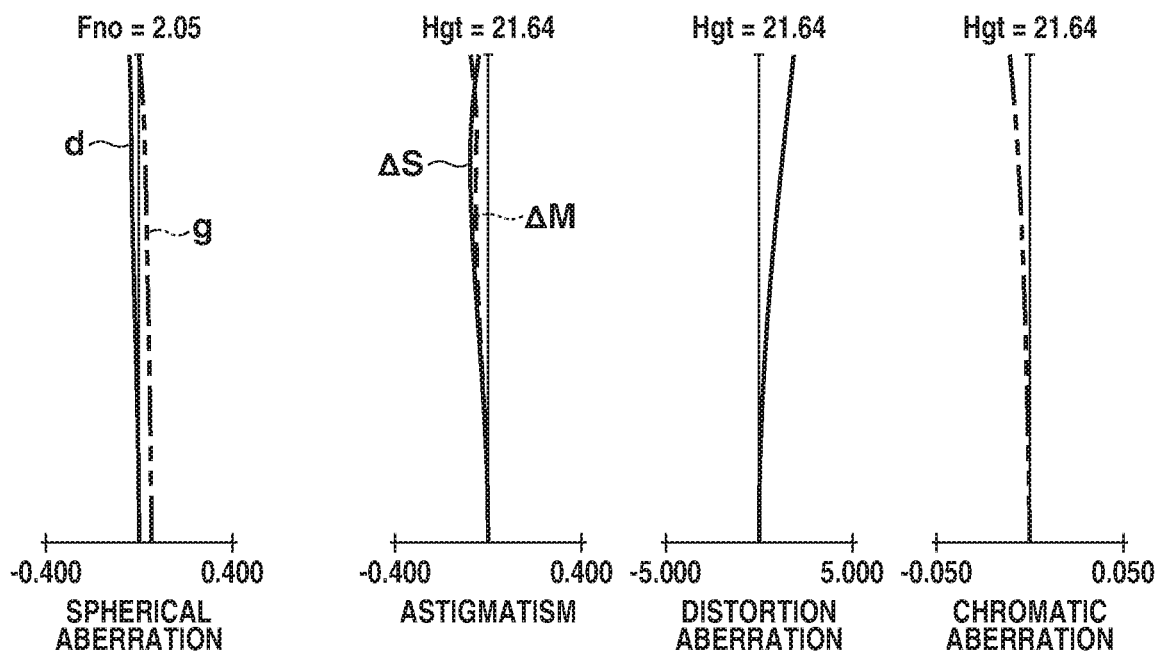
FIG. 8 is an aberration diagram of the optical system according to the fourth exemplary embodiment.
Figure 8:
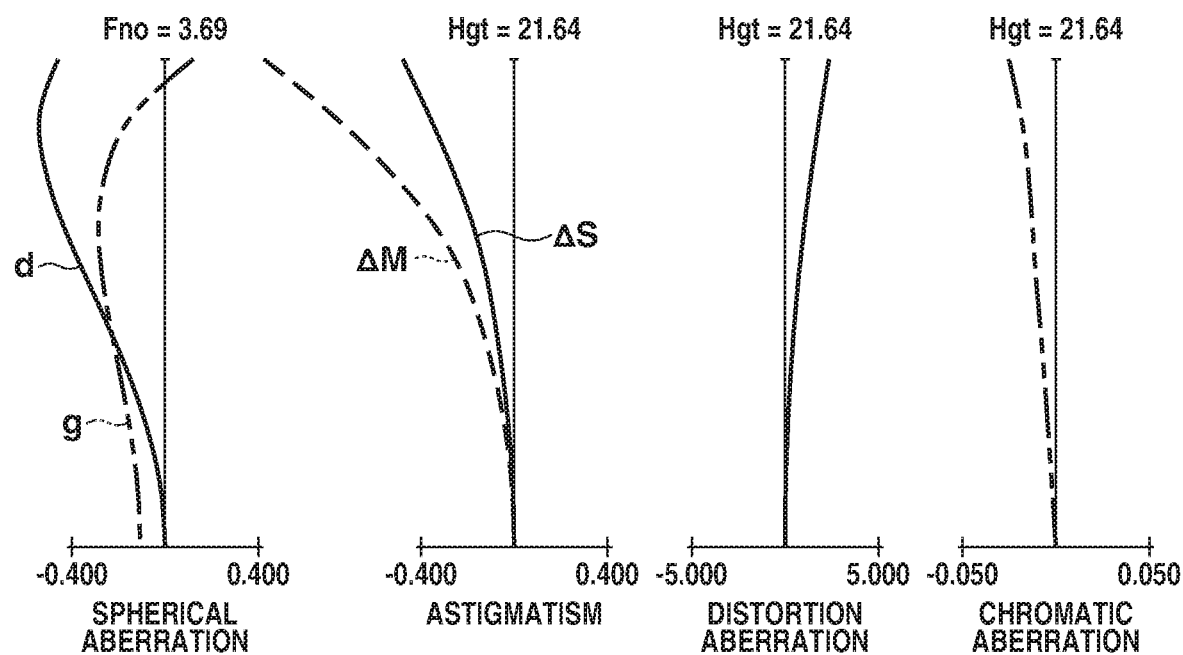
Figure 9:
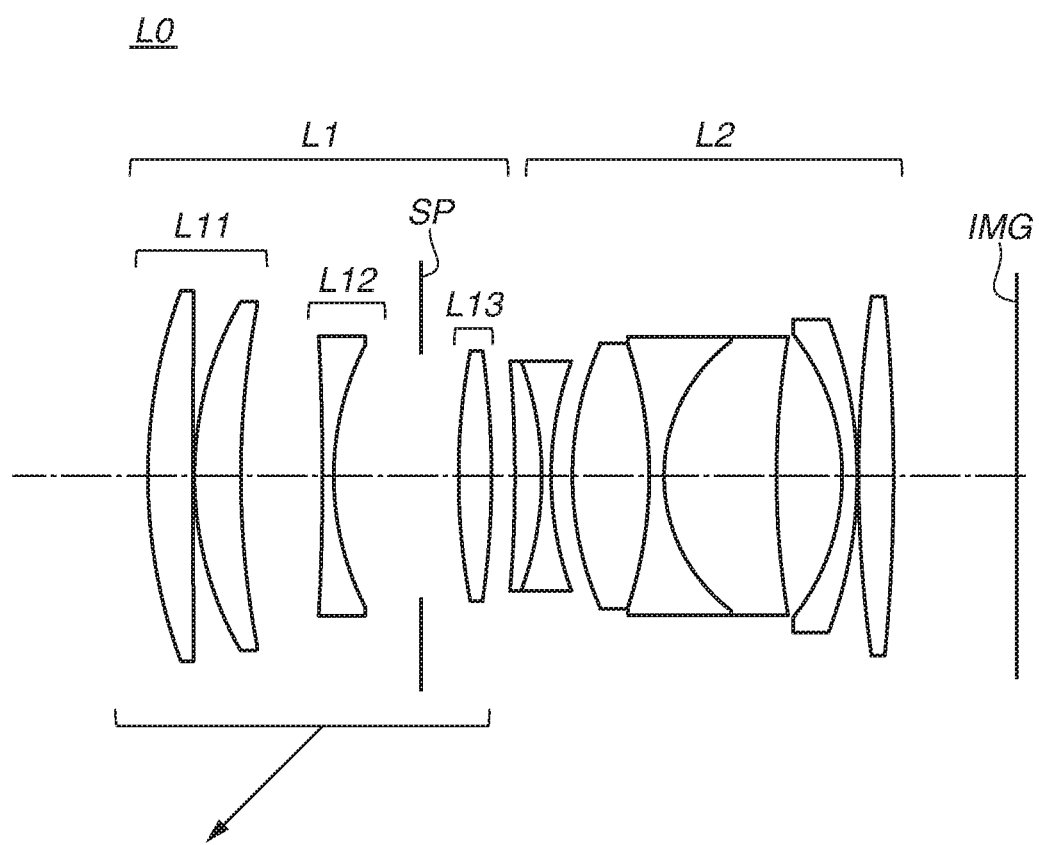
FIG. 9 is a cross-sectional view of an optical system according to a fifth exemplary embodiment.
Figure 10:
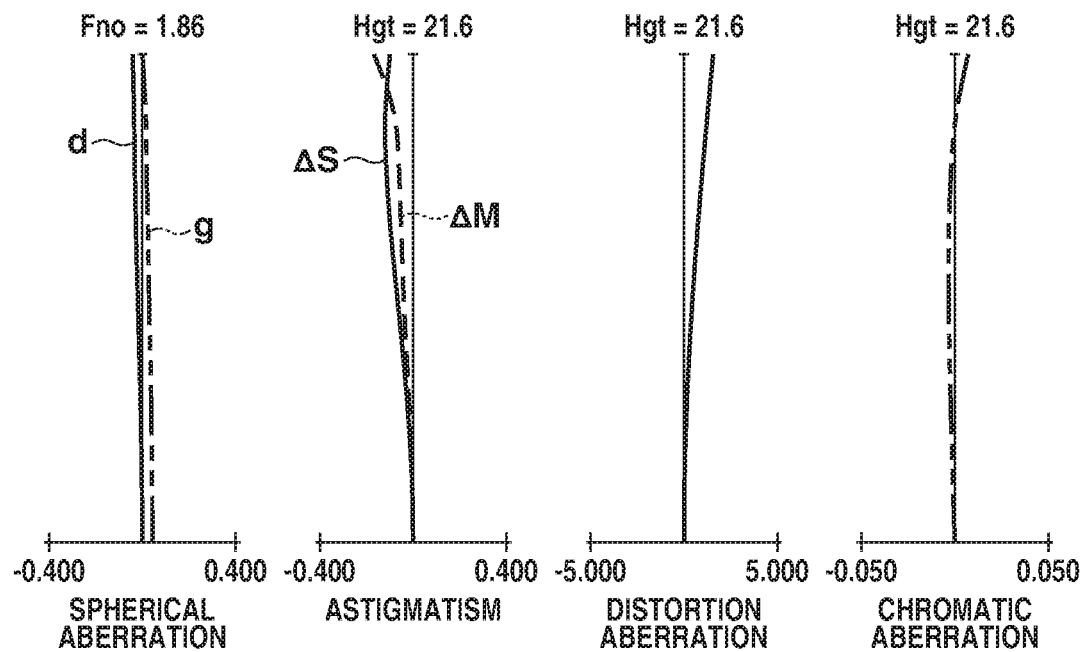
FIG. 10 is an aberration diagram of the optical system according to the fifth exemplary embodiment.
Figure 10:
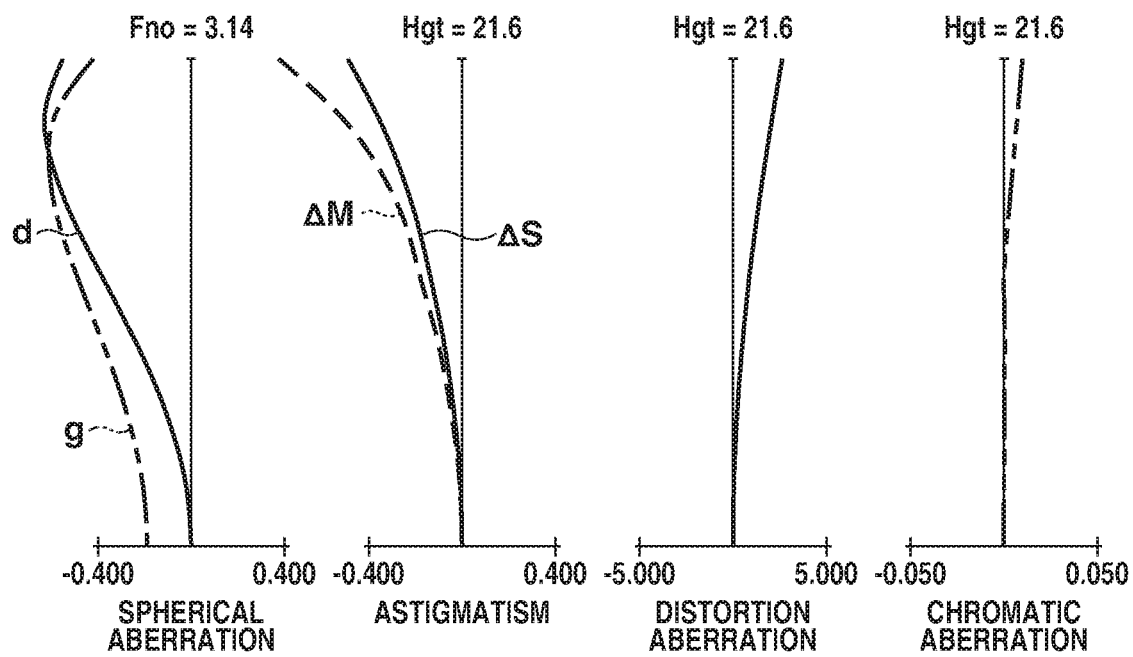
Figure 11:
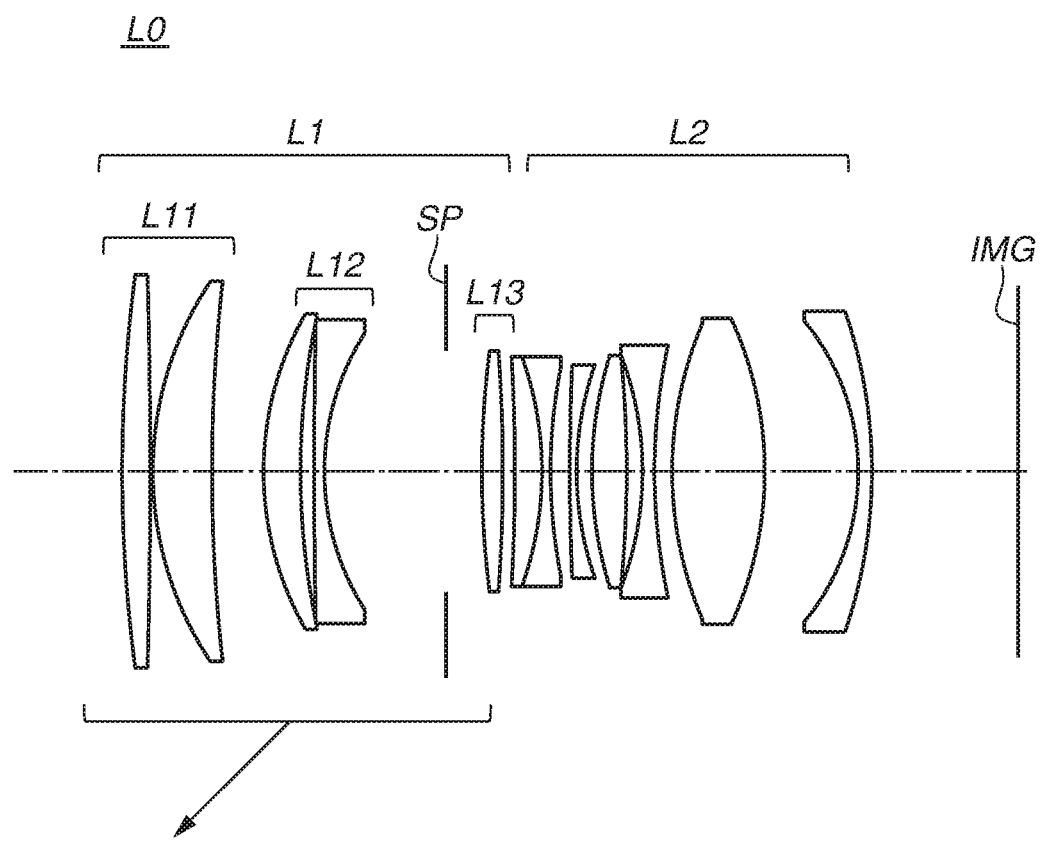
FIG. 11 is a cross-sectional view of an optical system according to a sixth exemplary embodiment.
Figure 12:
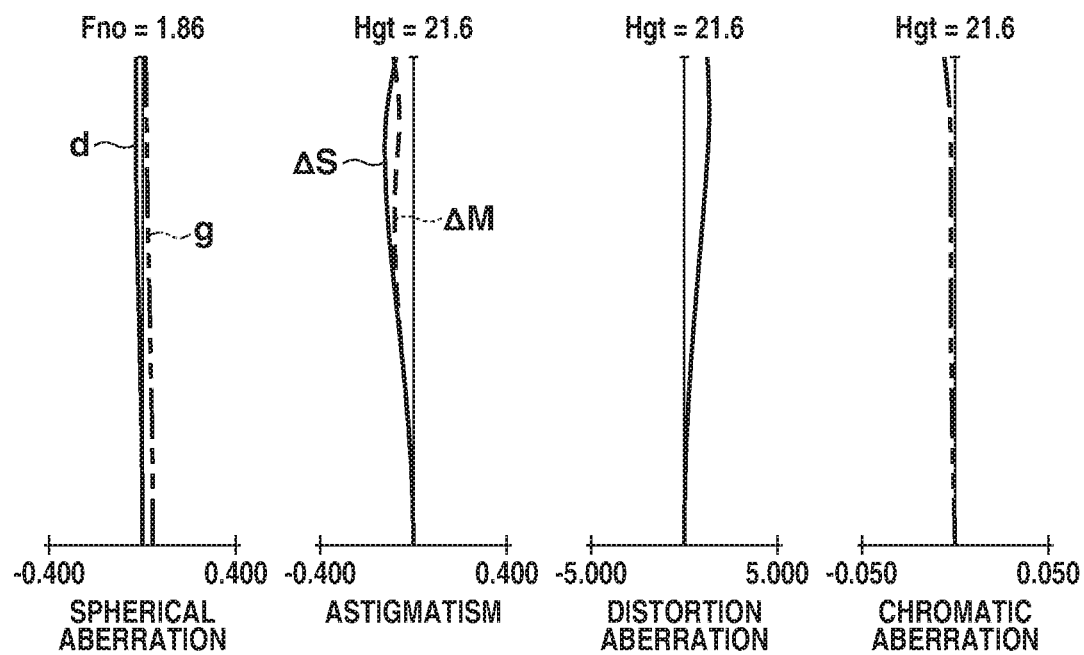
FIG. 12 is an aberration diagram of an optical system according to the sixth exemplary embodiment.
Figure 12:
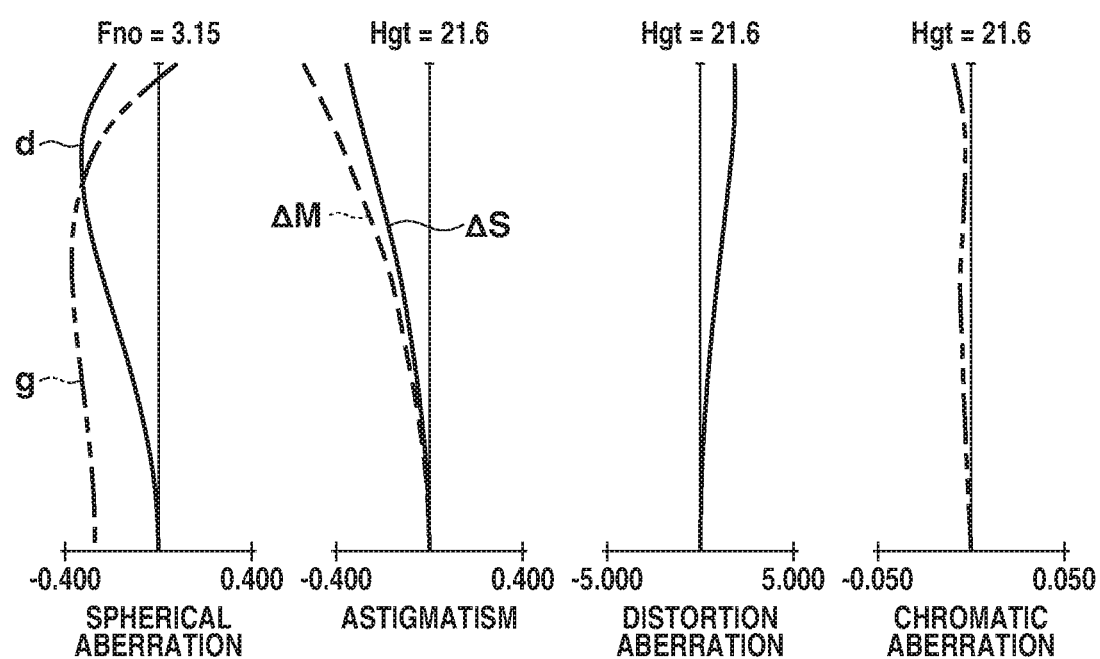
Figure 13:
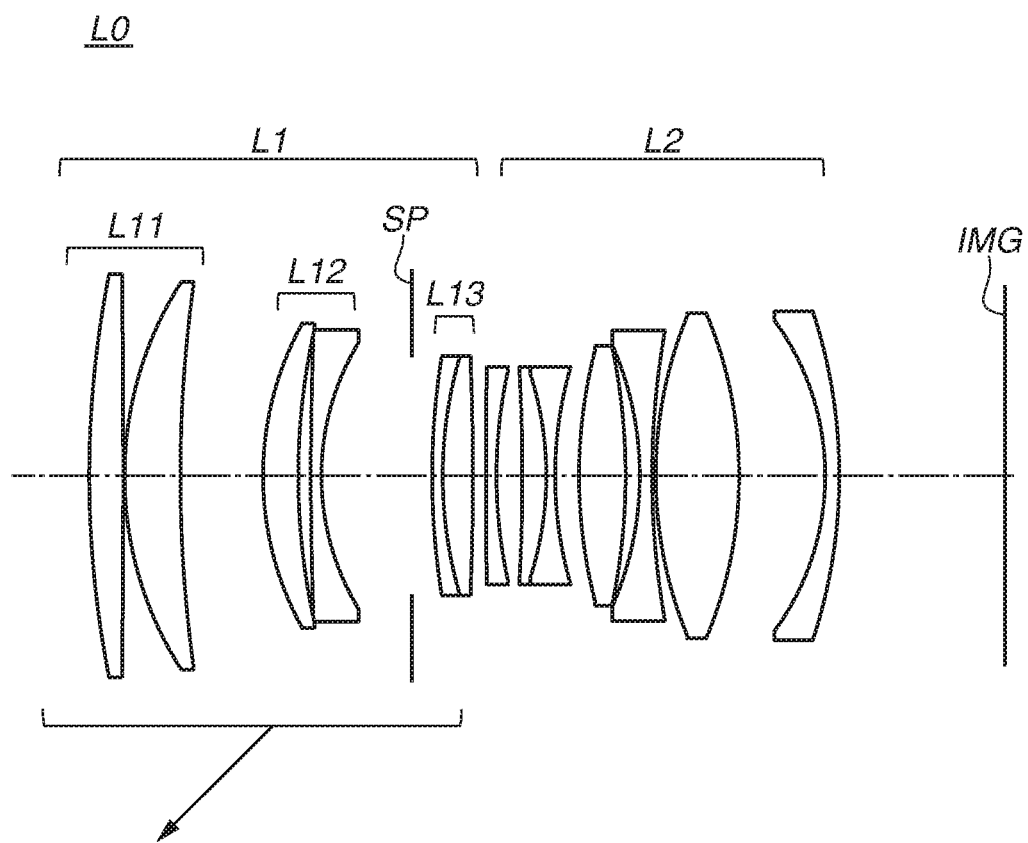
FIG. 13 is a cross-sectional view of an optical system according to a seventh exemplary embodiment.
Figure 14:
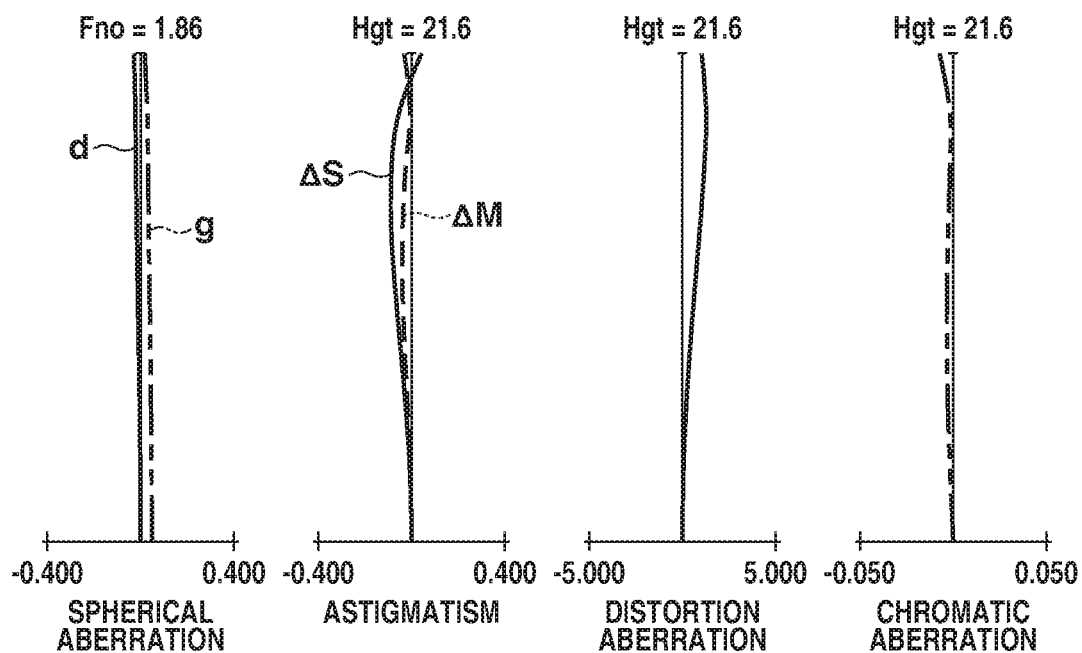
FIG. 14 is an aberration diagram of the optical system according to the seventh exemplary embodiment.
Figure 14:
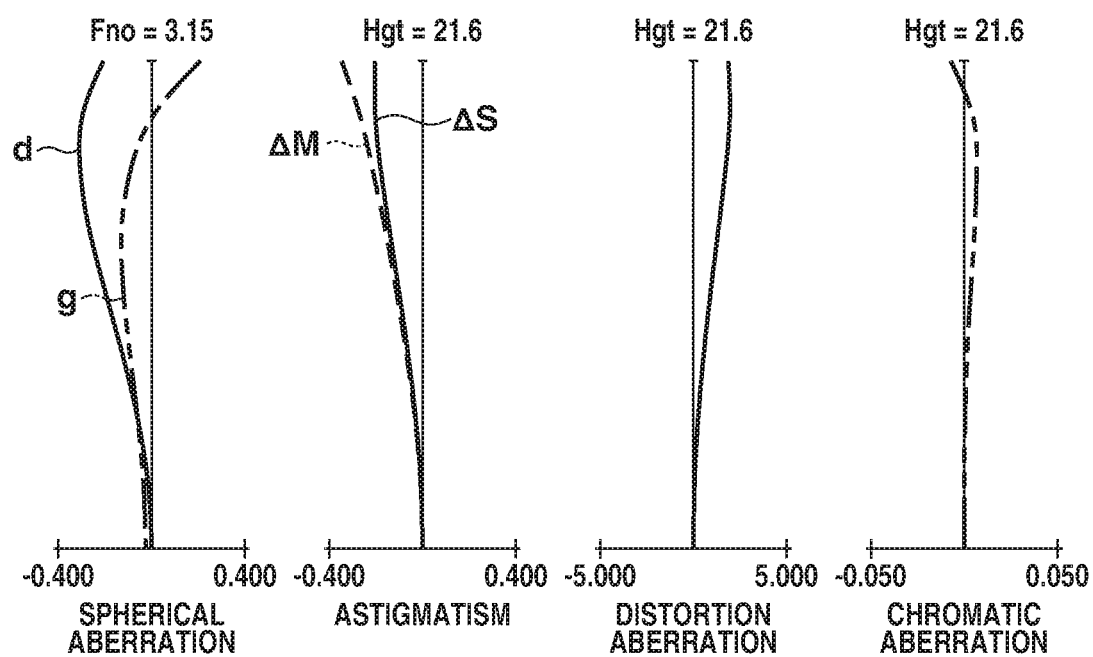

FIG. 2 is an aberration diagram of the optical system according to the first exemplary embodiment. FIG. 4 is an aberration diagram of the optical system according to the second exemplary embodiment. FIG. 6 is an aberration diagram of the optical system according to the third exemplary embodiment. FIG. 8 is an aberration diagram of the optical system according to the fourth exemplary embodiment. FIG. 10 is an aberration diagram of the optical system according to the fifth exemplary embodiment. FIG. 12 is an aberration diagram of the optical system according to the sixth exemplary embodiment. FIG. 14 is an aberration diagram of the optical systems according to the seventh exemplary embodiment. In the aberration diagrams in each exemplary embodiment, the upper diagrams are aberration diagrams in the in-focus state on the infinite-distance object, and the lower diagrams are aberration diagrams at an image-pickup magnification of −0.5.

In each spherical aberration diagram, Fno represents the F-number and the amount of spherical aberration at the d-line (at a wavelength of 587.6 nm) and the amount of spherical aberration at the g-line (at a wavelength of 435.8 nm) are indicated. In each astigmatism diagram, ΔS represents the amount of astigmatism on the sagittal image plane, and ΔM represents the amount of astigmatism on the meridional image plane. In each distortion aberration diagram, the amount of distortion aberration at the d-line is indicated. In each chromatic aberration diagram, the amount of chromatic aberration at the g-line is indicated. Hgt represents the image height.

Next, the characteristic configuration of the optical system according to each exemplary embodiment will be described.

In the optical system L0 according to each exemplary embodiment, a positive lens is provided at a position closest to the object side of the first lens unit L1. Providing the positive lens closest to the object side of the first lens unit L1 causes on-axis light to converge, so that the subsequent lenses can be reduced in diameter. This arrangement enables the entire reduction in diameter of the first lens unit L1 functioning as a focus lens unit, resulting in facilitating reduction in weight of the first lens unit L1.

In addition, in order to achieve the reduction in weight of the first lens unit L1 with the optical performance maintained, an appropriate configuration in the first lens unit L1 is important. Therefore, according to each exemplary embodiment, when the first lens unit L1 is divided at the largest interval and the second largest interval of the intervals in the first lens unit L1, the first lens unit L1 consists of the positive first subunit L11, the negative second subunit L12, and the positive third subunit L13 in order from the object side to the image side. Symmetrical power arrangement of the first subunit L11 and the third subunit L13 with respect to the second subunit L12 positioned at the intermediate in the first lens unit L1 enables effective correction of various aberrations occurring in the first subunit L11 and reduction of aberration variation accompanying focusing. In addition, the first subunit L11 of positive refractive power causes on-axis light to converge and the interval between the first subunit L11 and the second subunit L12 is made larger, so that the second subunit L12 and the third subunit L13 can be reduced in diameter. This arrangement facilitates the reduction in weight of the first lens unit L1. Moreover, the optical system L0 according to each exemplary embodiment also has a large interval between the second subunit L12 and the third subunit L13. Thus, this arrangement improves the symmetry of power arrangement in the first lens unit L1 and facilitates mainly correction of magnification chromatic aberration and coma aberration.

Furthermore, the arrangement of the second subunit L12 having negative refractive power at the intermediate position in the first lens unit L1 facilitates correction of spherical aberration and field curvature occurring in the first lens unit L1.

In the optical system L0 according to each exemplary embodiment, the second lens unit L2 having negative refractive power is provided on the image side of the first lens unit L1. Providing the second lens unit L2 having negative refractive power on the image side of the first lens unit L1 enables reduction of the moving amount of the first lens unit L1 during focusing. In addition, the second lens unit L2 can cancel a positive Petzval sum generated in the first lens unit L1, resulting in facilitation of correction of the field curvature.

In the optical system L0 according to each exemplary embodiment, the second lens unit L2 includes three or more lenses including at least two negative lenses. Including the two or more negative lenses in the second lens unit L2 facilitates the correction of various aberrations (particularly Petzval sum or spherical aberration) by the second lens unit L2. In addition, the three or more lenses included in the second lens unit L2 facilitate the correction of various aberrations (particularly coma aberration or magnification chromatic aberration). From these results, with the first lens unit L1 having a light weight resulting from the reduction of the number of lenses forming the first lens unit L1, high optical performance can be maintained.

While enabling rapid focusing with the above arrangement, the optical system L0 according to each exemplary embodiment has high optical performance.

Next, the satisfied configuration of the optical system L0 according to each exemplary embodiment will be described.

In the optical system L0 according to each exemplary embodiment, the aperture stop SP is arranged between the second subunit L12 and the third subunit L13. This arrangement enables ensuring the symmetry between the first subunit L11 and the third subunit L13 and ensuring a sufficient light amount even when the aperture stop is narrowed down regardless of an in-focus object distance.

In addition, from the viewpoint of rapid focusing, in one embodiment, in the optical system L0 according to each exemplary embodiment, the number of constituent lenses of the third subunit L13 is minimized as small as possible. Thus, the third subunit L13 consists of a single lens or a single cemented lens. The cemented lens is a lens obtained by combining a plurality of lenses. A large number of constituent lenses of the third subunit L13 (e.g., use of a negative lens, a positive lens, and a positive lens as in the so-called Gauss-type rear unit) are beneficial for correcting spherical aberration, but has difficulty in sufficient reduction in weight. In the optical system L0 according to each exemplary embodiment, instead of reduction in weight of the constituents of the first lens unit L1, the second lens unit L2 mainly corrects the various aberrations favorably.

Moreover, the first subunit L11 includes only a positive lens (positive lenses). The first subunit L11 is arranged closest to the object side in the optical system L0. Thus, the first subunit L11 including only the positive lens (positive lenses) enables effective convergence of on-axis light, so that the subsequent lenses can be reduced in diameter sufficiently. Furthermore, the first subunit L11 includes the lens relatively large in effective diameter in the optical system L0. An arrangement of a negative lens in the first subunit L11 is beneficial for the correction of distortion aberration and spherical aberration. The negative lens, however, tends to be larger in volume than the positive lens. Thus, no negative lens is arranged in the first subunit L11, so that the first subunit L11 can be more reduced in weight.

Furthermore, the second subunit L12 in the first lens unit L1 has an effect of mainly correcting the spherical aberration, on-axis chromatic aberration, and Petzval sum; however, an arrangement of many lenses in the second subunit L12 results in difficulty in sufficient reduction in weight of the first lens unit L1. Thus, preferably, the second subunit L12 consists of one negative lens, or consists of one positive lens and one negative lens. Due to more favorable on-axis chromatic aberration and Petzval sum, in one embodiment, the second subunit L12 consists of one positive lens and one negative lens.

Next, the conditions for satisfying the optical system according to each exemplary embodiment will be described. In one embodiment, the optical system according to each exemplary embodiment satisfies one or more of the following conditional expressions (1) to (8):

$$0.762 < f1/f < 1.026 \quad (1)$$

$$0.75 < |f2|/f < 3.76 \quad (2)$$

$$0.37 < D1/f < 0.69 \quad (3)$$

$$0.25 < D2/f < 0.68 \quad (4)$$

$$0.14 < sk/f < 0.30 \quad (5)$$

$$0.39 < f11/f < 1.13 \quad (6)$$

$$0.33 < |f12|/f < 1.44 \quad (7)$$

$$0.59 < f13/f < 1.21 \quad (8)$$

Here, f1 represents the focal length of the first lens unit L1. f represents the focal length of the optical system L0 in the in-focus state on the infinite-distance object. f2 represents the focal length of the second lens unit L2. D1 represents the distance from the lens surface closest to the object side of the first lens unit L1 from the lens surface closest to the image side of the first lens unit L1. D2 represents the distance from the lens surface closest to the object side of the second lens unit L2 to the lens surface closest to the image side of the second lens unit L2. sk represents the distance from the surface vertex of the lens surface closest to the image side of the second lens unit L2 to the image plane IP. When an optical member (e.g., cover glass) that has substantially no power in calculation of sk is arranged adjacently to the object side of the image plane IP, the optical member does not form the second lens unit L2. f11 represents the focal length of the first subunit L11. f12 represents the focal length of the second subunit L12. f13 is the focal length of the third subunit L13.

Conditional expression (1) defines the relationship in focal length between the first lens unit L1 and the entire optical system L0. If the value of the focal length of the first lens unit L1 is as large as beyond the upper limit of the conditional expression (1), the moving amount of the first lens unit L1 during focusing is extremely large. As a result, it is difficult to perform sufficiently rapid focusing. If the value of the focal length of the first lens unit L1 is as extremely small as below the lower limit of conditional expression (1), the amount of spherical aberration and field curvature generated in the first lens unit L1 is large. Thus, it is difficult to obtain sufficiently high optical performance.

Conditional expression (2) defines the relationship in focal length between the second lens unit L2 and the entire optical system L0. If the absolute value of the focal length of the second lens unit L2 is as large as beyond the upper limit of the conditional expression (2), the effect of the correcting spherical aberration and Petzval sum by the second lens unit L2 is small. Thus, it is difficult to obtain sufficiently high optical performance. If the absolute value of the focal length of the second lens unit L2 is as extremely small as below the lower limit of the conditional expression (2), the power arrangement of the optical system L0 is extremely asymmetric. Thus, the second lens unit L2 has difficulty in sufficient correction of distortion aberration and magnification chromatic aberration to be generated.

Conditional expression (3) defines the relationship between the length of the first lens unit L1 in the optical axis direction and the focal length of the entire optical system L0. In order to reduce the subsequent lens diameters by causing on-axis light to converge with the positive lenses arranged on the object side, setting of the length of the first lens unit L1 having positive refractive power at an appropriate value is effective. However, if the length of the first lens unit L1 is extremely long, vignetting of off-axis light is more likely to occur by the front lens (lens arranged closest to the object side). Thus, the front lens is increasing in size in order to ensure a sufficient light amount. If the length of the first lens unit L1 is as long as beyond the upper limit of the conditional expression (3), the front lens is extremely large. If the length of the first lens unit L1 is as short as below the lower limit of the conditional expression (3), it is difficult to sufficiently reduce in diameter the lenses included in the second subunit L12 and the third subunit L13.

Conditional expression (4) defines the relationship between the length of the second lens unit L2 in the optical axis direction and the focal length of the entire optical system L0. The length of the second lens unit L2 is increased to make the system of the second lens unit L2 thick. Thus, the degree of freedom in aberration correction can increase. As a result, image quality is more improved easily. However, if the length of the second lens unit L2 is extremely long, vignetting of off-axis light is more likely to occur by the rear lens (lens arranged closest to the image side). Thus, the rear lens is increasing in size in order to ensure a sufficient light amount. If the length of the second lens unit L2 is as long as beyond the upper limit of the conditional expression (4), the rear lens is large, which results in increase in weight. Furthermore, since a mechanism for supporting the lenses is increasing in size, the optical system L0 is increasing in size. Thus, such a long length of the second lens unit L2 is not desirable. If the length of the second lens unit L2 is as short as below the lower limit of the conditional expression (4), the degree of freedom in aberration correction in the second lens unit L2 is low. Thus, it is difficult to sufficiently correct various aberrations (particularly distortion aberration or coma aberration).

Conditional expression (5) defines the relationship between the back focus and the focal length of the entire optical system L0. If the back focus is as long as beyond the upper limit of conditional expression (5), the total length of the optical system L0 is extremely long. Thus, such long back focus is not desirable. If the back focus is as short as below the lower limit of the conditional expression (5), it may be difficult to ensure a sufficient space for arranging an optical member such as a low-pass filter, and a shutter unit and the like, between the second lens unit L2 and the image plane IP. As a result, the freedom degree of design on the image pickup apparatus side is low when the optical system L0 according to each exemplary embodiment is used as an image-pickup optical system of the image pickup apparatus. Thus, such short back focus is not desirable.

Conditional expression (6) defines the relationship in focal length between the first subunit L11 and the entire optical system L0. If the value of the focal length of the first subunit L11 is as large as beyond the upper limit of the conditional expression (6), the effect of converging on-axis light by the first subunit L11 is small. Thus, it is difficult to sufficiently reduce in diameter the second subunit L12 and the third subunit L13. As a result, it is difficult to sufficiently reduce in weight the first lens unit L1. If the value of the focal length of the first subunit L11 is as small as below the lower limit of the conditional expression (6), it is difficult to sufficiently correct distortion aberration and magnification chromatic aberration.

Conditional expression (7) defines the relationship in focal length between the second subunit L12 and the entire optical system L0. If the absolute value of the focal length of the second subunit L12 is as large as beyond the upper limit of conditional expression (7), the effect of aberration correction by the second subunit L12 is insufficient. Thus, it is difficult to sufficiently correct the spherical aberration, on-axis chromatic aberration, and Petzval sum. If the absolute value of the focal length of the second subunit L12 is as small as below the lower limit of conditional expression (7), it is difficult to sufficiently correct high order aberration. As a result, variation in spherical aberration around the pupil increases particularly during a long-distance image pickup and a short-distance image pickup. Thus, it is difficult to improve image quality over a wide image-pickup distance.

Conditional expression (8) defines the ratio of the focal length of the third subunit L13 to the focal length of the entire optical system L0. If the value of the focal length of the third subunit L13 is as large as beyond the upper limit of the conditional expression (8), the effect of aberration correction by the third subunit L13 is insufficient. As a result, it is difficult to sufficiently correct magnification chromatic aberration and coma aberration. If the value of the focal length of the third subunit L13 is as small as below the lower limit of the conditional expression (8), the power arrangement in the first lens unit L1 is similar to the retro-focus type power arrangement and the total length of the optical system L0 is extremely long. Thus, such a small value of the focal length of the third subunit L13 is not desirable.

In one embodiment, the numerical ranges of conditional expressions (1) to (8) are the ranges of the following conditional expressions (1a) to (8a), respectively:

$$0.777 < f1/f < 0.980 \tag{1a}$$

$$0.82 < |f2|/f < 3.52 \tag{2a}$$

$$0.40 < D1/f < 0.64 \tag{3a}$$

$$0.25 < D2/f < 0.64 \tag{4a}$$

$$0.15 < sk/f < 0.28 \tag{5a}$$

$$0.39 < f11/f < 1.05 \tag{6a}$$

$$0.36 < |f12|/f < 1.32 \tag{7a}$$

$$0.65 < f13/f < 1.13 \tag{8a}.$$

In addition, in another embodiment, the numerical ranges of conditional expressions (1) to (8) are the ranges of the following conditional expressions (1b) to (8b), respectively:

$$0.785 < f1/f < 0.920 \tag{1b}$$

$$0.89 < |f2|/f < 3.29 \tag{2b}$$

$$0.44 < D1/f < 0.60 \tag{3b}$$

$$0.30 < D2/f < 0.60 \tag{4b}$$

$$0.17 < sk/f < 0.27 \tag{5b}$$

$$0.47 < f11/f < 0.98 \tag{6b}$$

$$0.39 < |f12|/f < 1.26 \tag{7b}$$

$$0.70 < f13/f < 1.06 \tag{8b}.$$

Numerical Examples 1 to 7 respectively corresponding to the first to seventh exemplary embodiments will be indicated below.

In the surface data of each Numerical Example, r (mm) represents the curvature radius of each optical surface, and d (mm) represents the on-axis interval (distance on the optical axis) between the m-th surface and the m+1-th surface. However, m presents the number of the surface counted from the light incident side. In addition, nd represents the refractive index of each optical member at the d-line, and vd represents the Abbe number of the optical member.

In each Numerical Example, all of d, focal length (mm), F-number, and half angle of view (°) represent the values when the optical system according to each exemplary embodiment focuses on an object at infinity. The back focus BF represents the distance from the final lens surface to the image plane. The total lens length represents the value obtained by adding the back focus to the distance from the first lens surface to the final lens surface.

Numerical Example 1

Unit mm

| Surface number | r | d | nd | vd |
|---|---|---|---|---|
| 1 | 109.670 | 3.89 | 1.60311 | 60.6 |
| 2 | −13453.197 | 0.15 | | |
| 3 | 40.964 | 6.24 | 1.49700 | 81.5 |
| 4 | 152.598 | 9.64 | | |
| 5 | 35.061 | 4.10 | 1.59282 | 68.6 |
| 6 | 77.304 | 1.29 | | |
| 7 | 306.296 | 1.20 | 1.72825 | 28.5 |
| 8 | 29.098 | 10.10 | | |
| 9 (Aperture) | ∞ | 2.42 | | |
| 10 | 81.557 | 2.46 | 1.90043 | 37.4 |
| 11 | −367.944 | (Variable) | | |
| 12 | −3014.564 | 1.20 | 1.64769 | 33.8 |
| 13 | 57.651 | 2.98 | | |
| 14 | −197.606 | 2.79 | 1.92286 | 20.9 |
| 15 | −37.449 | 1.00 | 1.72047 | 34.7 |
| 16 | 46.613 | 3.18 | | |
| 17 | 54.242 | 5.78 | 1.67003 | 47.2 |
| 18 | −68.720 | 1.54 | | |
| 19 | −38.310 | 1.40 | 1.56732 | 42.8 |
| 20 | 82.874 | 0.82 | | |
| 21 | 48.826 | 9.38 | 1.77250 | 49.6 |
| 22 | −51.165 | 10.69 | | |
| 23 | −31.058 | 1.60 | 1.84666 | 23.8 |
| 24 | −64.222 | (BF) | | |
| Image plane | ∞ | | | |

Various types of data

| Focal length | 82.79 |
|---|---|
| F-number | 1.86 |
| Half angle of view (°) | 14.64 |
| Image height | 21.64 |
| Total lens length | 101.21 |
| BF | 15.89 |

| | ∞ | −0.5 times |
|---|---|---|
| d11 | 1.47 | 28.49 |

Numerical Example 2

Unit mm

| Surface number | r | d | nd | vd |
|---|---|---|---|---|
| 1 | 53.698 | 6.48 | 1.69680 | 55.5 |
| 2 | 13605.519 | 6.20 | | |
| 3 | 36.110 | 5.12 | 1.59282 | 68.6 |
| 4 | 91.341 | 1.95 | | |
| 5 | −905.701 | 1.20 | 1.67270 | 32.1 |
| 6 | 31.425 | 13.27 | | |
| 7 (Aperture) | ∞ | 10.05 | | |
| 8 | 116.751 | 2.92 | 1.72916 | 54.7 |
| 9 | −117.670 | (Variable) | | |
| 10 | −62.813 | 1.00 | 1.80000 | 29.8 |
| 11 | 60.998 | 3.97 | | |
| 12 | 66.454 | 9.06 | 1.95375 | 32.3 |
| 13 | −61.225 | 19.52 | | |
| 14 | −33.369 | 1.60 | 1.78472 | 25.7 |
| 15 | −73.589 | (BF) | | |
| Image plane | ∞ | | | |

Various types of data

| Focal length | 82.50 |
|---|---|
| F-number | 1.86 |
| Half angle of view (°) | 14.70 |
| Image height | 21.64 |
| Total lens length | 101.23 |
| BF | 16.35 |

| | ∞ | −0.5 times |
|---|---|---|
| d9 | 2.54 | 37.18 |

Numerical Example 3

Unit mm

| Surface number | r | d | nd | vd |
|---|---|---|---|---|
| 1 | 59.147 | 5.10 | 1.59349 | 67.0 |
| 2 | 299.280 | 0.15 | | |
| 3 | 39.761 | 4.86 | 1.49700 | 81.5 |
| 4 | 83.750 | 6.00 | | |
| 5 | 31.094 | 5.40 | 1.59282 | 68.6 |
| 6 | 93.251 | 0.77 | | |
| 7 | 179.792 | 1.20 | 1.73800 | 32.3 |
| 8 | 24.594 | 11.37 | | |
| 9 (Aperture) | ∞ | 9.93 | | |
| 10 | 77.264 | 2.23 | 1.80400 | 46.5 |
| 11 | −506.205 | (Variable) | | |
| 12 | −135.339 | 1.00 | 1.80610 | 33.3 |
| 13 | 38.836 | 1.52 | | |
| 14 | 38.263 | 11.32 | 1.74077 | 27.8 |
| 15 | −48.146 | 10.27 | | |
| 16 | −28.290 | 1.60 | 1.84666 | 23.8 |
| 17 | −134.602 | (BF) | | |
| Image plane | ∞ | | | |

Various types of data

| Focal length | 82.50 |
|---|---|
| F-number | 1.86 |
| Half angle of view (°) | 14.69 |
| Image height | 21.64 |
| Total lens length | 89.44 |
| BF | 14.42 |

| | ∞ | −0.5 times |
|---|---|---|
| d11 | 2.29 | 31.6 |

Numerical Example 4

Unit mm

| Surface number | r | d | nd | vd |
|---|---|---|---|---|
| 1 | 83.142 | 3.99 | 1.59349 | 67.0 |
| 2 | 247.758 | 0.15 | | |
| 3 | 38.802 | 7.80 | 1.49700 | 81.5 |
| 4 | 154.819 | 0.15 | | |
| 5 | 35.816 | 4.97 | 1.49700 | 81.5 |
| 6 | 64.596 | 8.78 | | |

-continued

| Unit mm | | | | |
|---|---|---|---|---|
| 7 | 149.262 | 1.20 | 1.73887 | 28.1 |
| 8 | 24.692 | 12.33 | | |
| 9 (Aperture) | ∞ | 4.00 | | |
| 10 | 56.184 | 2.27 | 1.95772 | 31.6 |
| 11 | 205.265 | (Variable) | | |
| 12 | −182.428 | 3.16 | 1.92286 | 20.9 |
| 13 | −31.805 | 1.00 | 1.77541 | 35.8 |
| 14 | 35.974 | 2.59 | | |
| 15 | 38.749 | 5.80 | 1.80630 | 46.3 |
| 16 | −54.922 | 1.60 | 1.84697 | 23.8 |
| 17 | −113.085 | 0.15 | | |
| 18 | 2339.654 | 2.00 | 1.61636 | 43.1 |
| 19 | 22.222 | 6.01 | 1.51608 | 53.6 |
| 20 | 89.421 | 4.59 | | |
| 21 | −32.428 | 1.60 | 1.92297 | 20.9 |
| 22 | −47.782 | 0.15 | | |
| 23 | 171.140 | 2.42 | 2.00103 | 29.1 |
| 24 | −486.410 | (BF) | | |
| Image plane | ∞ | | | |

| Various types of data | |
|---|---|
| Focal length | 98.50 |
| F-number | 2.05 |
| Half angle of view (°) | 12.39 |
| Image height | 21.64 |
| Total lens length | 104.21 |
| BF | 25.00 |

| | ∞ | −0.5 times |
|---|---|---|
| d11 | 2.50 | 37.18 |

Numerical Example 5

| Unit mm | | | | |
|---|---|---|---|---|
| Surface number | r | d | nd | vd |
| 1 | 57.307 | 4.81 | 1.58718 | 69.0 |
| 2 | 2917.360 | 0.15 | | |
| 3 | 37.731 | 4.94 | 1.69213 | 58.0 |
| 4 | 95.607 | 8.70 | | |
| 5 | −272.228 | 1.20 | 1.71526 | 29.2 |
| 6 | 30.833 | 9.29 | | |
| 7 (Aperture) | ∞ | 4.00 | | |
| 8 | 71.548 | 3.52 | 1.77456 | 49.4 |
| 9 | −93.145 | (Variable) | | |
| 10 | −141.581 | 2.85 | 1.92286 | 20.9 |
| 11 | −35.153 | 1.00 | 1.72051 | 36.1 |
| 12 | 35.617 | 2.27 | | |
| 13 | 34.846 | 8.20 | 1.88165 | 37.7 |
| 14 | −43.732 | −0.03 | | |
| 15 | −45.039 | 1.60 | 1.74258 | 27.9 |
| 16 | 18.000 | 11.98 | 1.66976 | 32.3 |
| 17 | 89.462 | 7.00 | | |
| 18 | −24.504 | 1.60 | 1.80803 | 22.8 |
| 19 | −47.020 | 0.15 | | |
| 20 | 133.582 | 3.73 | 1.98464 | 28.0 |
| 21 | −195.679 | (BF) | | |
| Image plane | ∞ | | | |

| Various types of data | |
|---|---|
| Focal length | 71.09 |
| F-number | 1.86 |
| Half angle of view (°) | 16.93 |
| Image height | 21.64 |

-continued

| Unit mm | | |
|---|---|---|
| Total lens length | | 92.50 |
| BF | | 13.04 |

| | ∞ | −0.5 times |
|---|---|---|
| d9 | 2.50 | 31.16 |

Numerical Example 6

| Unit mm | | | | |
|---|---|---|---|---|
| Surface number | r | d | nd | vd |
| 1 | 173.807 | 3.27 | 1.61800 | 63.4 |
| 2 | −818.806 | 0.30 | | |
| 3 | 39.895 | 6.89 | 1.49700 | 81.5 |
| 4 | 198.596 | 6.01 | | |
| 5 | 37.106 | 4.30 | 1.59282 | 68.6 |
| 6 | 86.491 | 1.58 | | |
| 7 | 777.888 | 1.20 | 1.69895 | 30.1 |
| 8 | 30.010 | 14.19 | | |
| 9 (Aperture) | ∞ | 4.15 | | |
| 10 | 110.133 | 2.44 | 1.90043 | 37.4 |
| 11 | −193.363 | (Variable) | | |
| 12 | −229.105 | 3.16 | 1.92286 | 20.9 |
| 13 | −39.441 | 1.00 | 1.59270 | 35.3 |
| 14 | 62.269 | 2.24 | | |
| 15 | 286.618 | 0.80 | 1.59349 | 67.0 |
| 16 | 37.496 | 1.78 | | |
| 17 | 44.912 | 4.04 | 1.77250 | 49.6 |
| 18 | −135.082 | 1.85 | | |
| 19 | −37.829 | 1.40 | 1.69895 | 30.1 |
| 20 | 69.408 | 2.06 | | |
| 21 | 44.055 | 10.78 | 1.61800 | 63.4 |
| 22 | −42.519 | 10.88 | | |
| 23 | −27.659 | 1.60 | 1.59270 | 35.3 |
| 24 | −57.250 | (BF) | | |
| Image plane | ∞ | | | |

| Various types of data | |
|---|---|
| Focal length | 82.81 |
| F-number | 1.86 |
| Half angle of view (°) | 14.64 |
| Image height | 21.64 |
| Total lens length | 101.83 |
| BF | 14.49 |

| | ∞ | −0.5 times |
|---|---|---|
| d11 | 1.41 | 31.84 |

Numerical Example 7

| Unit mm | | | | |
|---|---|---|---|---|
| Surface number | r | d | nd | vd |
| 1 | 117.345 | 3.86 | 1.60311 | 60.6 |
| 2 | −1761.216 | 0.15 | | |
| 3 | 40.828 | 6.33 | 1.49700 | 81.5 |
| 4 | 158.671 | 9.37 | | |
| 5 | 35.845 | 3.99 | 1.59282 | 68.6 |
| 6 | 76.461 | 1.43 | | |
| 7 | 421.299 | 1.20 | 1.69895 | 30.1 |
| 8 | 29.235 | 10.28 | | |

-continued

| | Unit mm | | | |
|---|---|---|---|---|
| 9 (Aperture) | ∞ | 2.28 | | |
| 10 | 85.074 | 1.20 | 1.85478 | 24.8 |
| 11 | 48.139 | 3.42 | 1.91082 | 35.3 |
| 12 | −314.625 | (Variable) | | |
| 13 | 760.079 | 1.20 | 1.69895 | 30.1 |
| 14 | 55.173 | 2.93 | | |
| 15 | −218.160 | 2.72 | 1.92286 | 20.9 |
| 16 | −37.679 | 1.00 | 1.72047 | 34.7 |
| 17 | 44.097 | 2.72 | | |
| 18 | 57.038 | 5.27 | 1.66998 | 39.3 |
| 19 | −70.744 | 1.60 | | |
| 20 | −36.896 | 1.40 | 1.57501 | 41.5 |
| 21 | 93.293 | 0.42 | | |
| 22 | 47.909 | 9.45 | 1.77250 | 49.6 |
| 23 | −47.516 | 9.77 | | |
| 24 | −29.905 | 1.60 | 1.84666 | 23.8 |
| 25 | −59.414 | (BF) | | |
| Image plane | ∞ | | | |

| Focal length | 82.79 |
|---|---|
| F-number | 1.86 |
| Half angle of view (°) | 14.65 |
| Image height | 21.64 |
| Total lens length | 101.32 |
| BF | 16.26 |

| | ∞ | −0.5 times |
|---|---|---|
| d12 | 1.48 | 27.50 |

Table 1 below summarizes the various values in each numerical example.

TABLE 1

| | f1/f | \|f2\|/f | D1/f | D2/f | sk/f | f11/f | \|f12\|/f | f13/f |
|---|---|---|---|---|---|---|---|---|
| First exemplary embodiment | 0.8079 | 2.7713 | 0.5011 | 0.5116 | 0.1920 | 0.8312 | 1.0407 | 0.8978 |
| Second exemplary embodiment | 0.9165 | 2.5774 | 0.5720 | 0.4261 | 0.1982 | 0.9377 | 1.1978 | 0.9794 |
| Third exemplary embodiment | 0.8430 | 0.9349 | 0.5698 | 0.3117 | 0.1748 | 0.8162 | 1.1548 | 1.0123 |
| Fourth exemplary embodiment | 0.8392 | 2.6805 | 0.4634 | 0.3155 | 0.2538 | 0.4910 | 0.4082 | 0.8140 |
| Fifth exemplary embodiment | 0.8980 | 3.1363 | 0.5150 | 0.5675 | 0.1835 | 0.6578 | 0.5438 | 0.7418 |
| Sixth exemplary embodiment | 0.8573 | 2.7974 | 0.5354 | 0.5023 | 0.1750 | 0.8405 | 1.0497 | 0.9447 |
| Seventh exemplary embodiment | 0.7929 | 2.4529 | 0.5256 | 0.4841 | 0.1963 | 0.8256 | 1.0280 | 0.8614 |

[Image Pickup Apparatus]

Figure 15:
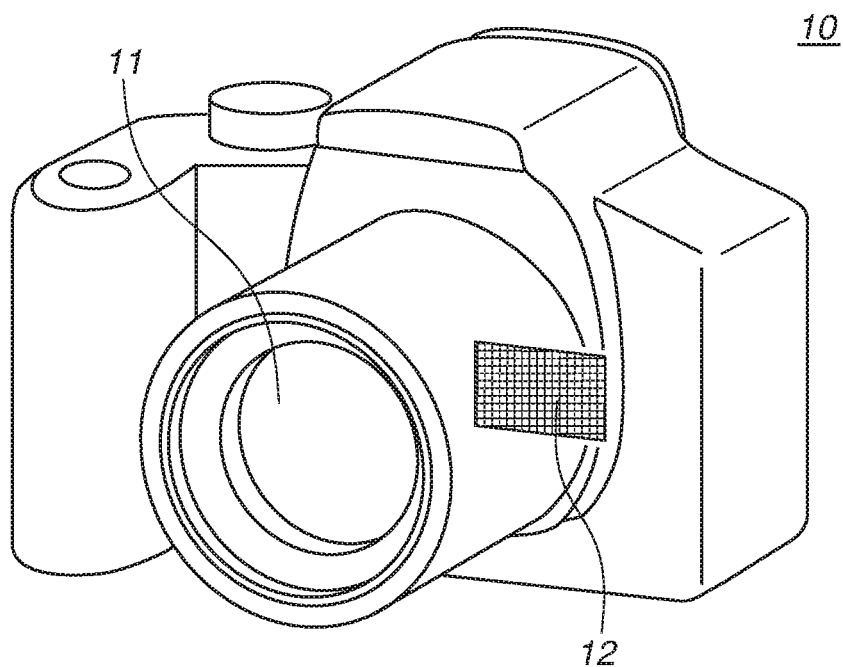
FIG. 15 is a schematic illustration of an image pickup apparatus.

Next, an exemplary embodiment of a digital still camera (image pickup apparatus), which uses an optical system according to an exemplary embodiment of the disclosure as an image-pickup optical system will be described with reference to FIG. 15. FIG. 15 illustrates a camera body 10 including an image-pickup optical system 11 and a solid-state image pickup element 12. In FIG. 15, the image-pickup optical system 11 consists of any of the optical systems described in the first to seventh exemplary embodiments. The solid-state image pickup element 12 (photoelectric conversion element) such as a CCD sensor or a CMOS sensor incorporated in the camera body 10 receives an optical image formed by the image-pickup optical system 11 and photoelectrically converts the optical image. The camera body 10 may be a so-called single-lens reflex camera including a quick-turn mirror or a so-called mirrorless camera not including a quick turn mirror.

In this manner, an image pickup apparatus having high optical performance while enabling rapid focusing can be obtained by applying an optical system according to an exemplary embodiment of the disclosure to an image pickup apparatus such as a digital still camera.

The exemplary embodiments and numerical examples of the disclosure have been described above. The disclosure, however, is not limited to these exemplary embodiments and numerical examples, and various combinations, modifications, and changes can be made within the scope of the gist of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-224135, filed Nov. 29, 2018, which is hereby incorporated by reference herein in its entirety.

What is claimed is:

1. An optical system comprising, in order from an object side to an image side:
   a first lens unit having positive refractive power; and
   a second lens unit having negative refractive power,
   wherein the first lens unit moves and the second lens unit does not move during focusing,
   wherein the first lens unit includes a positive lens arranged closest on the object side of the first lens unit,
   wherein the second lens unit includes three or more lenses including at least two negative lenses,
   wherein when the first lens unit is divided at a largest interval and a second largest interval of intervals between adjacent lenses in the first lens unit, the first lens unit consists of a first subunit having positive refractive power, a second subunit having negative refractive power, and a third subunit having positive refractive power arranged in order from the object side to the image side, and
   wherein the following conditional expressions are satisfied:

$$0.14 < sk/f < 0.30$$

$$0.59 < f13/f < 1.21$$

where sk represents a distance on an optical axis from a lens surface closest to the image side of the second lens unit to an image plane, f represents a focal length of the optical system in an in-focus state on an infinite-distance object, and f13 represents a focal length of the third subunit, and
wherein the following conditional expression is satisfied:

$$0.33<|f12|/f<1.44$$

where f12 represents a focal length of the second subunit.

2. The optical system according to claim 1, wherein the following conditional expression is satisfied:

$$0.762<f1/f<1.026$$

where f1 represents a focal length of the first lens unit.

3. The optical system according to claim 1, wherein the following conditional expression is satisfied:

$$0.75<|f2|/f<3.76$$

where f2 represents a focal length of the second lens unit.

4. The optical system according to claim 1, wherein the following conditional expression is satisfied:

$$0.37<D1/f<0.69$$

where D1 represents a distance from a lens surface closest to the object side of the first lens unit to a lens surface closest to the image side of the first lens unit.

5. The optical system according to claim 1, wherein the following conditional expression is satisfied:

$$0.25<D2/f<0.68$$

where D2 represents a distance from a lens surface closest to the object side of the second lens unit to the lens surface closest to the image side of the second lens unit.

6. The optical system according to claim 1, wherein the following conditional expression is satisfied:

$$0.39<f11/f<1.13$$

where f11 represents a focal length of the first subunit.

7. The optical system according to claim 1, wherein an aperture is arranged between the second subunit and the third subunit.

8. The optical system according to claim 1, wherein the third subunit consists of a single lens or a single cemented lens.

9. The optical system according to claim 1, wherein the first subunit consists of one or more positive lenses.

10. The optical system according to claim 1, wherein the second subunit consists of one negative lens.

11. The optical system according to claim 1, wherein the second subunit consists of one positive lens and one negative lens.

12. An image pickup apparatus comprising:
the optical system according to claim 1; and
an image pickup element configured to photoelectrically convert an image formed by the optical system.

13. The image pickup apparatus according to claim 12, wherein the following inequality is satisfied:

$$0.762<f1/f<1.026$$

where f1 represents a focal length of the first lens unit.

14. The image pickup apparatus according to claim 12, wherein the following inequality is satisfied:

$$0.75<|f2|/f<3.76$$

where f2 represents a focal length of the second lens unit.

15. The image pickup apparatus according to claim 12, wherein the following inequality is satisfied:

$$0.37<D1/f<0.69$$

where D1 represents a distance from a lens surface closest to the object side of the first lens unit to a lens surface closest to the image side of the first lens unit.

16. The image pickup apparatus according to claim 12, wherein the following inequality is satisfied:

$$0.25<D2/f<0.68$$

where D2 represents a distance from a lens surface closest to the object side of the second lens unit to the lens surface closest to the image side of the second lens unit.

17. The image pickup apparatus according to claim 12, wherein the following inequality is satisfied:

$$0.39<f11/f<1.13$$

where f11 represents a focal length of the first subunit.

18. The image pickup apparatus according to claim 12, wherein the following inequality is satisfied:

$$0.33<|f12|/f<1.44$$

where f12 represents a focal length of the second subunit.

19. The image pickup apparatus according to claim 12, wherein an aperture is arranged between the second subunit and the third subunit.

* * * * *